US010089987B2

(12) United States Patent
Keal et al.

(10) Patent No.: US 10,089,987 B2
(45) Date of Patent: Oct. 2, 2018

(54) MUSIC DETECTION AND IDENTIFICATION

(71) Applicant: InvenSense, Inc., San Jose, CA (US)

(72) Inventors: William Kerry Keal, Santa Clara, CA (US); Ajay Kumar Dhanapalan, San Jose, CA (US); Sangnam Choi, San Jose, CA (US); Carlo Murgia, Sunnyvale, CA (US); Eitan A. Medina, Palo Alto, CA (US); Taro Kimura, San Francisco, CA (US)

(73) Assignee: InvenSense, Inc., San Jose, CA (US)

( * ) Notice: Subject to any disclaimer, the term of this patent is extended or adjusted under 35 U.S.C. 154(b) by 1 day.

(21) Appl. No.: 15/384,297

(22) Filed: Dec. 19, 2016

(65) Prior Publication Data
US 2017/0178681 A1 Jun. 22, 2017

Related U.S. Application Data

(60) Provisional application No. 62/270,483, filed on Dec. 21, 2015.

(51) Int. Cl.
G10L 21/00 (2013.01)
G10L 15/28 (2013.01)
G10H 1/00 (2006.01)
G10L 25/81 (2013.01)
G10L 25/51 (2013.01)

(52) U.S. Cl.
CPC ......... *G10L 15/285* (2013.01); *G10H 1/0008* (2013.01); *G10H 1/0033* (2013.01); *G10L 25/51* (2013.01); *G10L 25/81* (2013.01); *G10H 2210/046* (2013.01); *G10H 2220/351* (2013.01); *G10H 2220/355* (2013.01); *G10H 2220/391* (2013.01); *G10H 2220/395* (2013.01); *G10H 2230/015* (2013.01); *G10H 2240/211* (2013.01); *G10H 2240/305* (2013.01)

(58) Field of Classification Search
CPC ......... G06F 17/30743; G06F 17/30861; G06F 11/3013; G06F 19/3406; G06F 19/3493; H04N 21/4394; A63B 71/0622; A63B 71/0686; G10H 1/40; G10H 2210/076; G10H 2240/131; G10L 25/54
USPC ........... 455/456.1; 700/94; 709/217; 84/612; 704/275, 273
See application file for complete search history.

(56) References Cited

U.S. PATENT DOCUMENTS

| 7,328,153 | B2 * | 2/2008 | Wells | G06F 17/30017 704/231 |
| 7,653,921 | B2 * | 1/2010 | Herley | H04N 7/16 382/100 |
| 9,275,141 | B2 * | 3/2016 | Wang | G06F 17/30861 |

(Continued)

*Primary Examiner* — Vijay B Chawan

(57) ABSTRACT

A sensor processing unit comprises a microphone and a sensor processor. The sensor processor is coupled with the microphone. The sensor processor is configured to operate the microphone to capture an audio sample from an environment in which the microphone is disposed. The sensor processor is configured to perform music activity detection on the audio sample to detect for music within the audio sample. Responsive to detection of music within the audio sample, the sensor processor is configured to send a music detection signal to an external processor located external to the sensor processing unit, the music detection signal indicating that music has been detected in the environment.

28 Claims, 11 Drawing Sheets

(56) References Cited

U.S. PATENT DOCUMENTS

| | | | |
|---|---|---|---|
| 2006/0122839 A1* | 6/2006 | Li-Chun Wang | G06F 17/30743 704/273 |
| 2006/0277047 A1* | 12/2006 | DeBusk | G06K 9/00523 704/273 |
| 2007/0261538 A1* | 11/2007 | Takai | A63B 24/0087 84/612 |
| 2009/0043577 A1* | 2/2009 | Godavarti | G10L 21/02 704/233 |
| 2011/0184732 A1* | 7/2011 | Godavarti | G10L 21/02 704/207 |
| 2011/0276157 A1* | 11/2011 | Wang | G06F 17/30861 700/94 |
| 2014/0018097 A1* | 1/2014 | Goldstein | G06F 19/3406 455/456.1 |
| 2016/0156731 A1* | 6/2016 | Wang | G06F 17/30861 709/217 |
| 2016/0360327 A1* | 12/2016 | Ungstrup | H04R 25/554 |
| 2017/0034259 A1* | 2/2017 | Hunter | H04L 67/104 |

\* cited by examiner

800

---

OPERATING, BY A FIRST PROCESSOR, A MICROPHONE TO CAPTURE AN AUDIO SAMPLE FROM AN ENVIRONMENT IN WHICH THE MICROPHONE IS DISPOSED
801

↓

PERFORMING, BY THE FIRST PROCESSOR, MUSIC ACTIVITY DETECTION ON THE AUDIO SAMPLE TO DETECT FOR MUSIC WITHIN THE AUDIO SAMPLE
803

↓

RESPONSIVE TO DETECTION OF MUSIC WITHIN THE AUDIO SAMPLE, SENDING, BY THE FIRST PROCESSOR, A SIGNAL TO A SECOND PROCESSOR, WHEREIN THE FIRST PROCESSOR AND THE SECOND PROCESSOR MAY BOTH DISPOSED WITHIN A MOBILE ELECTRONIC DEVICE
805

↓

WIRELESSLY PROVIDING, BY THE SECOND PROCESSOR, INFORMATION ABOUT THE AUDIO SAMPLE TO A MUSIC IDENTIFICATION SERVICE
807

↓

WIRELESSLY RECEIVING, AT THE SECOND PROCESSOR, IDENTIFICATION INFORMATION ASSOCIATED WITH THE AUDIO SAMPLE FROM THE MUSIC IDENTIFICATION SERVICE
809

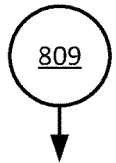

STORING, BY THE SECOND PROCESSOR, THE IDENTIFICATION INFORMATION FOR FUTURE ACCESS BY A USER OF THE MOBILE ELECTRONIC DEVICE
820

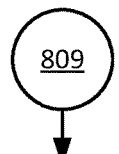

PROVIDING, BY THE SECOND PROCESSOR, THE IDENTIFICATION INFORMATION FOR ACCESS BY A USER OF THE MOBILE ELECTRONIC DEVICE
830

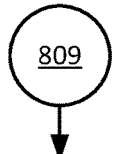

FOREGOING, BY THE SECOND PROCESSOR, USE OF AN AVAILABLE BUT NON-PREFERRED CONNECTION TO THE INTERNET TO WAIT FOR AVAILABILITY OF A PREFERRED CONNECTION TO THE INTERNET TO WIRELESSLY PROVIDE INFORMATION ABOUT THE AUDIO SAMPLE TO THE MUSIC IDENTIFICATION SERVICE
840

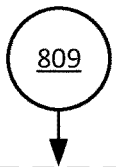

BASED ON THE IDENTIFICATION INFORMATION, PRESENTING, BY THE MOBILE ELECTRONIC DEVICE, A USER OF THE MOBILE ELECTRONIC DEVICE WITH AN OPTION TO ACQUIRE A PRODUCT ASSOCIATED WITH THE AUDIO SAMPLE WHEREIN THE PRODUCT IS SELECTED FROM THE GROUP CONSISTING OF: A SONG; AN ALBUM; AND A CONCERT TICKET
850

FIG. 8E 800 continued

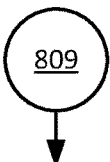

SUSPENDING THE MUSIC ACTIVITY DETECTION ON A SECOND AUDIO SAMPLE, CAPTURED AFTER THE AUDIO SAMPLE, FOR A PERIOD OF TIME, WHEREIN THE PERIOD OF TIME IS BASED ON THE IDENTIFICATION INFORMATION
860

FIG. 8F

MUSIC DETECTION AND IDENTIFICATION

CROSS REFERENCE TO RELATED APPLICATIONS—PROVISIONAL

This application claims priority to and benefit of co-pending U.S. Provisional Patent Application No. 62/270,483 filed on Dec. 21, 2015 entitled "Background Audio Contents Detection and Identification" by William Kerry Keal et al., which is assigned to the assignee of the present application. The disclosure of U.S. Provisional Patent Application No. 62/270,483 is hereby incorporated herein by reference in its entirety.

BACKGROUND

Advances in technology have enabled the introduction of electronic devices that feature an ever-increasing set of capabilities. Smartphones, for example, now offer sophisticated computing and sensing resources together with expanded communication capability, digital imaging capability, and user experience capability. Likewise, tablets, wearables, media players, Internet connected devices (which may or may not be mobile), and other similar electronic devices have shared in this progress and often offer some or all of these capabilities. Many of the capabilities of electronic devices, and in particular mobile electronic devices, are enabled by sensors (e.g., accelerometers, gyroscopes, pressure sensors, thermometers, acoustic sensors, etc.) that are included in the electronic device. That is, one or more aspects of the capabilities offered by electronic devices will rely upon information provided by one or more of the sensors of the electronic device in order to provide or enhance the capability. In general, sensors detect or measure physical or environmental properties of the device/sensor or its surroundings. This can comprise detecting one or more of the orientation, velocity, and acceleration of the device. Additionally, or alternatively, this can comprise detecting one or more physical properties such as, but not limited to, the temperature, acoustic energy (sound), and/or atmospheric pressure of the device/sensor and/or the environment in which the device/sensor is located.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 8A-8F illustrate a flow diagram of an example method of identifying music, in accordance with various embodiments.

DESCRIPTION OF EMBODIMENTS

Figure 1:
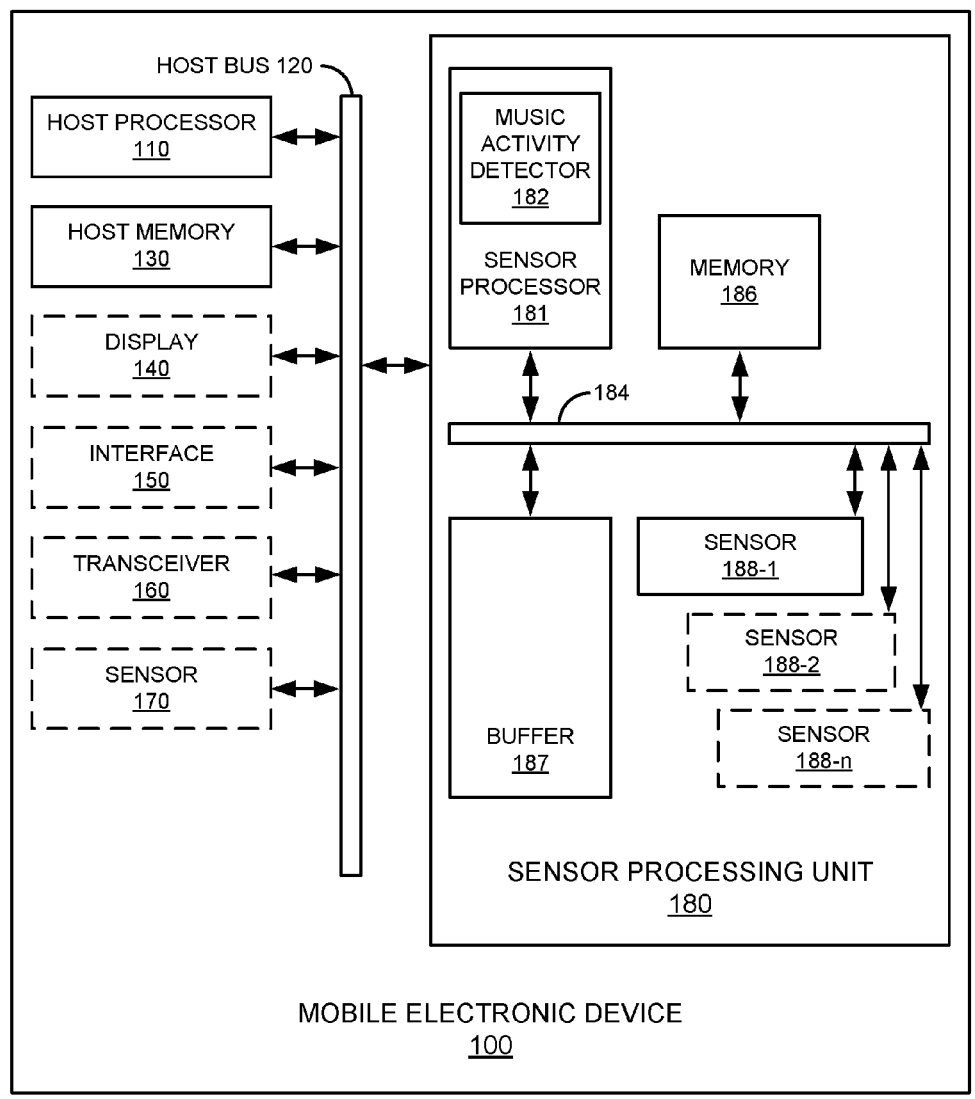
FIG. 1 is a block diagram of a mobile electronic device which includes a sensor processing unit, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "operating," "performing," "sending," "storing," "providing," "receiving," "adapting," "resuming," "detecting," "preventing," "applying," "foregoing," "waiting," "presenting," "pausing," "suspending," or the like, refer to the actions and processes of an electronic device such as: a sensor processing unit, a sensor processor, a host processor, a processor, a sensor, a memory, a mobile electronic device, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device(s) described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable data storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more sensor processing units (SPUs), sensor processor(s), host processor(s) or core(s) thereof, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Overview of Discussion

Example embodiments described herein, improve the usability of electronic devices. One or more sensors and sensor processing unit(s) which operate it/them may operate to detect or measure physical or environmental properties of a mobile electronic device or its surroundings while a host processor portion of the mobile electronic device in which the sensor is disposed is in a low-power mode (e.g., a sleep mode), while the host processor is too busy with other tasks, and/or while the host processor has off-loaded tasks to a dedicated processor, such as a sensor processor in a sensor processing unit. A low-power mode operates a host processor at less than its full-power mode/full-capability mode in order to conserve power use of the mobile electronic device. One or more tasks may be off-loaded from a host processor to a dedicated processor to free up processing cycles on the host processor and/or because the dedicated processor is more efficient in energy or in conduct of the off-loaded task(s). Mobile electronic devices include, but are not limited to, electronic devices such as: a cellular telephone, a smart cellular telephone, a media player, a tablet computer, a notebook computer, digital camera, and a wearable (e.g., a wrist wearable device like a watch, a pendant, a fitness tracker, or the like).

Any always-on or nearly always-on feature in a mobile electronic device has to deal with strict low-power constraints either to conserve battery power or to be energy efficient, since it is designed to run continuously, in some embodiments, without the user starting or stopping the feature. This implies that the mobile electronic device and any algorithms running thereon should be frugal in terms of computational resources and that higher-level functions should be relegated to the post-wakeup phase on the host processor for local operations, or else to a cloud-based processor or other external server for remote operations. In a mobile electronic device with a host processor and a sensor processor, as described herein, the sensor processor uses less power and may thus be kept active when the host processor is powered down or placed in a low-power mode (e.g., a sleep mode) that uses less power than a full-power mode. The sensor processor may be instructed or configured to wake-up the host processor when a certain triggering event is detected. Likewise, due to consuming less power than the host processor, the sensor processor may be assigned to a dedicated environmental sensing task, such as operating a microphone to capture an audio sample and to then perform music activity detection on the audio sample to detect for music in an environment of the mobile electronic device in which the sensor processor is incorporated. The detection of music in an audio sample may then be the triggering event that allows a sensor processing unit to wake up the host processor, for example to analyze the music or determine the type or song that is playing.

Discussion begins with a description of a mobile electronic device with a sensor processing unit that includes at least one microphone. This is followed by some examples of operational descriptions of the mobile electronic device and the sensor processing unit starting with a general description of operation to provide an overview and proceeding to a more comprehensive description of operation. Various communications of signals and/or data between the sensor processor and host processor are described. Some example timing diagrams of duty cycle operation of a microphone are described. Finally, operation of the mobile electronic device and the sensor processing unit are further described in conjunction with description of example method(s) of identifying music.

Example Mobile Electronic Device

Turning now to the figures, FIG. 1 is a block diagram of an example mobile electronic device 100. As will be appreciated, mobile electronic device 100 may be implemented as a device or apparatus, such as a handheld mobile electronic device, that can be moved in space by a human user. That is, mobile electronic device 100 is small enough to be held in the hand of a human user, in various embodiments. For example, such a mobile electronic device may be, without limitation, a mobile telephone (e.g., smartphone, cellular telephone, a cordless telephone running on a local network, or any other cordless telephone handset), a wired telephone (e.g., a telephone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a virtual or augmented reality device (e.g., a head mounted display), a digital still camera, a digital video camera, a portable music player, a portable video player, a portable multi-media player, a remote control, a mobile Internet of things (IOT) device, or a combination of one or more of these devices. The exact configuration of the device may depend on the type of device and its intended functions. Therefore, the block diagram of FIG. 1 is merely an example, and the different blocks may be otherwise distributed over host and sensor processing unit 180. For example, all blocks of SPU 180 may be integrated into a standalone sensor processing unit that may be disposed in a single package or even a single integrated circuit.

As depicted in FIG. 1, mobile electronic device 100 may include a host processor 110, a host bus 120, a host memory 130, and a sensor processing unit 180. As depicted in dashed lines, some embodiments of mobile electronic device 100 may further include one or more of a display 140, an interface 150, a transceiver 160, a sensor 170. In various embodiments, electrical power for mobile electronic device 100 is provided by a mobile power source such as a battery, when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of mobile electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit 180, and other components of mobile electronic device 100 may be coupled communicatively through host bus 120 in order to exchange commands and data. Depending on the architecture, different bus configurations may be employed as desired. For example, additional buses may be used to couple the various components of mobile electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for mobile electronic device 100 to control and manage system resources in real time, enable functions of application software and other layers, and interface application programs with other software and functions of mobile electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for a camera.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at mobile electronic device 100 from an external transmission source and transmission of data from mobile electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Sensor 170, when included, may comprise, without limitation: a temperature sensor, an atmospheric pressure sensor, an infrared sensor, an ultrasonic sensor, a radio frequency sensor, a navigation satellite system sensor (such as a global positioning system receiver), an acoustic sensor (e.g., a microphone), an image sensor, an inertial or motion sensor (e.g., a gyroscope, accelerometer, or magnetometer) for measuring the orientation or motion of the sensor in space, or other type of sensor for measuring other physical or environmental quantities. Sensor 170 is coupled with host bus 120 for communication with host processor 110, host memory 130, and sensor processing unit 180. Although depicted as being included with/native to mobile electronic device 100, sensor 170 may be located external to mobile electronic device 100 and communicate with mobile electronic device 100 via a wired or wireless coupling. Since sensor 170 is external to sensor processing unit 180, sensor 170 may be referred to as an external sensor.

Mobile electronic device 100 also includes a general purpose sensor assembly in the form of integrated sensor processing unit (SPU) 180 which includes sensor processor 181, memory 186, at least one sensor 188 (188-1, 188-2, . . . 188-n), a buffer 187, and a bus 184 for facilitating communication between these and other components of sensor processing unit 180. In some embodiments, some or all of the components illustrated in sensor processing unit 180 may be embodied in a single package or even on a single integrated circuit. For example, the sensor processor 181, buffer 187, and at least one sensor 188 (which may be an acoustic sensor) may be integrated with one another into a single package or even in a single integrated circuit. It should be appreciated that sensor processing unit 180 may be manufactured as a stand-alone unit (e.g., an integrated circuit), that may exist separately from a larger electronic device. Although depicted as a portion of mobile electronic device 100, in some embodiments, sensor processing unit 180 may be incorporated in an electronic device that is not mobile; two non-limiting examples of this include using sensor processing unit 180 in a voice recognition component of an Internet connected "smart" refrigerator, and within an Internet connected voice controllable speaker/appliance such as Amazon's Echo.

Sensor processor 181 can be one or more microprocessors, CPUs, DSPs, general purpose microprocessors, ASICs, ASIPs, FPGAs or other processors which run software programs, which may be stored in memory 186, associated with the functions of sensor processing unit 180.

Bus 184 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 181, memory 186, buffer 187, sensor(s) 188, and other components of sensor processing unit 180 may be communicatively coupled through bus 184 in order to exchange data.

Memory 186 can be any suitable type of memory, including but not limited to electronic memory (e.g., read only memory (ROM), random access memory, or other electronic memory). Memory 186 may store algorithms or routines or other instructions for processing data received from one or more sensors 188, as well as the received data either in its raw form or after some processing. Such algorithms and routines may be implemented by sensor processor 181 and/or by logic or processing capabilities included in sensor 188.

Buffer 187 is a data buffer that temporarily stores data received from one or more sensors 188. Data buffer 187 may store the received data in its raw form, or in a processed form after the raw data has been processed in some fashion. Buffer 187 may be operated to buffer one or more audio samples. Although depicted as an independent entity, in some embodiments, buffer 187 may be a portion or subset of memory 186. In some embodiments, buffer 187 may be a circular buffer.

Sensor processing unit 180 includes at least one sensor 188, but may include two or more sensors 188 of the same or different types. A sensor 188 may comprise, without limitation: a temperature sensor, an atmospheric pressure sensor, an infrared sensor, an ultrasonic sensor, a radio frequency sensor, a navigation satellite system sensor (such as a global positioning system receiver), an acoustic sensor (e.g., a microphone), an image sensor, an inertial or motion sensor (e.g., a gyroscope, accelerometer, or magnetometer) for measuring the orientation or motion of the sensor in space, or other type of sensor for measuring other physical or environmental quantities. In one example, sensor 188-1 may comprise an acoustic sensor (i.e., a microphone), sensor 188-2 may comprise a second acoustic sensor (i.e., a second microphone), and sensor 188-n may comprise an internal motion sensor. It should be appreciated that other types of sensors may be utilized in various other combinations that include at least one acoustic sensor. Since sensor 188 is incorporated in sensor processing unit 180, sensor 188 may be referred to as an internal sensor.

In some embodiments, the mobile electronic device 100 may contain more than one sensor processing unit 180. The different sensor processing units 180 may communicate which each other or with the host over host bus 120. The different sensor processing units 180 may contain different sensors, or may contain identical sensors.

In some embodiments, one or more sensors 188 may be implemented using a micro-electro-mechanical system (MEMS) that is integrated with sensor processor 181 and one or more other components of SPU 180 in a single chip or package.

Although depicted as being included within sensor processing unit 180, one, some, or all sensors 188 may be disposed externally to sensor processing unit 180 in various embodiments. In such a case, the sensor(s) 188 may be referred to as external sensors and may be connected to host bus 120 or to bus 184 to communicate with host processor 110 and/or sensor processing unit 180.

In some embodiments sensor processing unit 180 may further include a Music Activity Detector (MAD) 182 which may be implemented in one or some combination of hardware, or hardware with one or more of software and firmware. It should be appreciated that MAD 182 may be implemented all or in part as an algorithm stored as processor executable structures within memory 186.

In one embodiment, MAD 182 is based on the detection of long-time sustained harmonics in the frequency spectrum of an audio sample. The detection of long-time sustained harmonics may also be referred to as Continuous Frequency Activation (CFA), since music continuously activates certain frequencies in the frequency spectrum. Therefore, the CFA function or feature would result in a spectrum of sharp peaks, as will be discussed in detail below. This activation of certain frequencies may be due to the instruments used in the music. In noise there are no sustained harmonics, and in speech the pitch is constantly and quickly changing, hence creating smoothed peaks rather than sharp peaks. As such, MAD 182 may use an algorithm that focuses on the two main CFA features being: 1) the detection of the harmonics; and 2) the verification that these harmonics are sustained in time.

Figure 2:
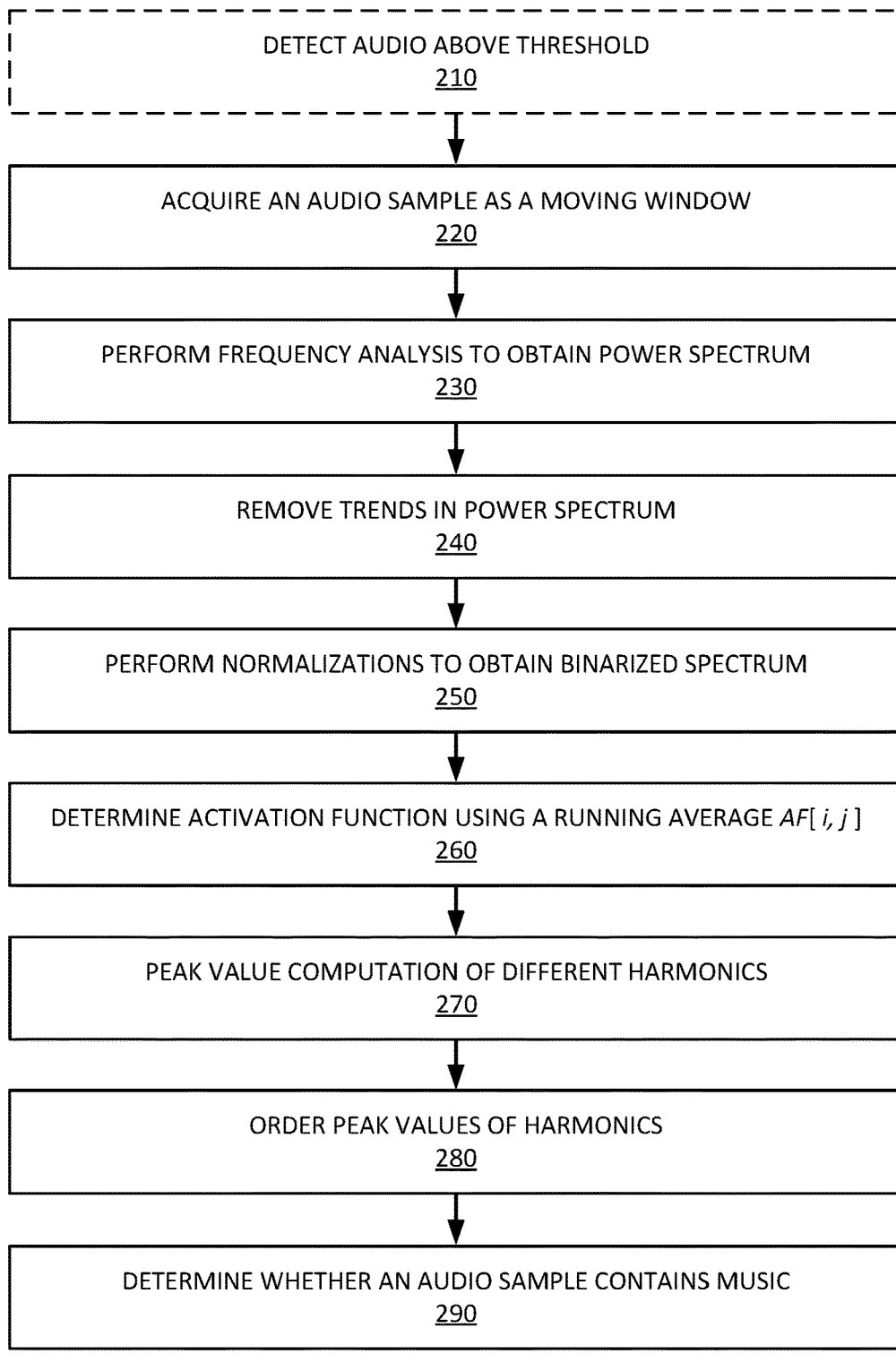
FIG. 2 shows a flow diagram of an example method of music activity detection, which may be used in a Music Activity Detector, according to various embodiments.

FIG. 2 shows a flow diagram 200 of an example method of music activity detection, which may be used in music activity detection (e.g., to implement MAD 182) according to various embodiments. It is appreciated that in some embodiments, the procedures may be performed in a different order than described, that some of the described procedures may not be performed, and/or that one or more additional procedures to those described may be performed. Flow diagram 200 includes some procedures that, in various embodiments, are carried out by one or more processors under the control of computer-readable and computer-executable instructions that are stored on non-transitory computer-readable storage media (e.g., memory 186). It is further appreciated that one or more procedures described in flow diagram 200 may be implemented in hardware, or a combination of hardware with firmware and/or software.

At 220 of flow diagram 200, in some embodiments, an audio sample (such as audio sample 305A of FIGS. 3A and 3B) is acquired from a microphone. The audio sample may be acquired as a moving window. This can comprise sensor processor 181 operating one or more microphones to capture the audio sample, wherein the microphone(s) may be disposed within sensor processing unit 180 or external to sensor processing unit 180 but within mobile electronic device 100. Because the procedures of flow diagram 200 follow the presence of the harmonics over time, in some embodiments, a sliding window technique is used to acquire the audio sample wherein each window (or frame) has a certain width and a certain overlap with the window from the previous iteration. A window size may typically be between 10 ms and 100 ms, and the overlap percentage may be from 10% to 50%. For example, a window size of 32 ms with a 75% overlap would have a skip rate of 8 ms, meaning that each new window contains 8 ms of new audio sample data.

At 230 of flow diagram 200, in some embodiments, a frequency analysis is performed on the audio sample to obtain a power spectrum. Sensor processor 181 may perform the frequency analysis for each window, using for example a form of Fourier transform (e.g., Fast Fourier Transform or Short-Time Fourier Transform). During a Fourier transform, a frequency spectrum is determined for each window, wherein each spectrum is divided in a number, $N_{bins}$, of frequency bins, frequency ranges, frequency intervals, or the like. For example, a frequency spectrum may be divided into 128, 256, 512 or 1024 frequency bins, ranges, or intervals. The number, $N_{bins}$, of frequency bins may be related to the sampling frequency of the microphone. This may determine the frequency resolution. In one embodiment, if lower number of $N_{bins}$ are used, the frequency resolution is decreased. In such an embodiment, to reduce power, the FFT can be run with fewer bins. In one embodiment, for example, if a lower number of $N_{bins}$ is used, the frequency resolution is decreased, and to reduce power, the frequency analysis can be run with fewer bins. Because only the amplitude of the frequencies is of interest, the spectrum may also be referred to as a power spectrum, and as such the value of each frequency bin represents the presence or power of the frequencies within the corresponding frequency interval. When a window of samples is extracted from the incoming sensor data stream from the microphone, this window has an abrupt start and finish. However, any abrupt transition may influence the frequency analysis, especially at higher frequencies. Therefore, the window is filtered before the frequency analysis in order to remove the abrupt transitions and discontinuities at both ends, which may comprise an application of a smoothing function, such as e.g., a Hamming window. Some frequencies may have less power, and this property should not influence the analysis in a negative manner. For example, higher frequencies in general have a lower power (due to the higher absorption) than lower frequencies, but the higher frequencies may be just as valuable for the harmonics analysis. Other embodiments of 230 of flow diagram 200 include using a set of band pass filters to obtain the power spectrum.

Therefore, as depicted in 240 of flow diagram, in some embodiments, any trends in the frequency pattern are removed. For example, trends (as a function of the frequency) are corrected for in a frequency trend removal or correction. This trend removal or correction may be performed, for example, by sensor processor 181 using a running average over a number (e.g., 10 or 20) frequency bins.

In some embodiments, as depicted in 250 of flow diagram 200, a normalization is performed to obtain a binarized spectrum. For example, sensor processor 181 performs some sort of normalization to keep even week harmonic structures and equalize their contribution to the spectrum. For example, a thresholding technique may be applied where all frequency bins above the threshold are normalized to 1 and all frequency bins below to threshold are set to 0. The normalization may also be referred to a binarization, and yields binarized spectrum $B[i,j]$ where i represents the window number and j represent the frequency bin or interval.

After 220-250 of flow diagram 200, in some embodiments, the result is that each audio sample window is converted in a binary frequency spectrum showing the harmonics of the current audio sample window. Next, it may be determined how these harmonics behave over time since the goal of MAD is to detect long-time sustained harmonics.

At 260 of flow diagram 200, in some embodiments, an activation function may be determined using a running average. The detection of the long-time harmonics may be referred to as the Activation Function (AF), since this function determines whether or not music is present, and activates the music identification if music is present. Using a running average method may require less power and memory resources than many other techniques for determining long term harmonics that store various spectrums in memory. To determine (or update) an activation function, sensor processor 181 determines a running average of the binarized spectrums. For example, once a new binarized spectrum has been computer for the current window or frame, an activation function, AF, may be updated in the manner described by Equation 1:

$$AF[i,j] = \alpha * AF[i-1,j] + (1-\alpha) * B[i,j] \qquad \text{Equation 1}$$

wherein i represents the current window, j represents the frequency bin, B[i,j] represents the binarized spectrum, and α represents the forgetting factor.

For example, the forgetting factor α may be set as 0.995, which means the activation function AF spans about 200 frames of past history into the current activation function AF[i,j]. The larger the factor α, the longer the history of the activation function. The combination of a factor α of 0.995 and a window refresh rate of 8 ms, would give a history of about 1.5 seconds. These parameters may be modified to adapt the detection of the long-time' aspect of the harmonics, required the harmonics to be sustained for longer or shorter periods. For example, the parameter may be modified to adapt to the user or to a certain type of music.

The determined activation function AF shows the different sustained harmonics, and, as described in 270 and 280 of flow diagram 200, in some embodiments, this function may be quantized in order to be able to make a decision whether or not the observed activation function is representative of music.

In 270 of flow diagram 200, in some embodiments, a peak value computation (PVC) may be used to quantify the different harmonics. The PVC comprises sensor processor 181 determining a peak value, pv, for each harmonic, wherein the peak value pv is defined as the ratio of the height of the peak divided by the width of the peak. The height and width of a peak may be determined with respect to the nearest local minima on both sides of a peak. As such, the higher and narrower the peak, the higher the peak value pv and the more important the harmonic is. The result of the PVC is a list of the harmonics, which may comprise their frequencies and peak values.

As described in 280 of flow diagram 200, in some embodiments, these harmonics may be ordered, and then the largest $N_{harm}$ number of harmonics may be selected and their peak value summed up. Sensor processor 181 may perform the ordering and summing. The sum may then be used and referred to as the CFA function.

In 290 of flow diagram 200, it is determined whether an audio sample contains music (i.e., whether music is detected within the audio sample). Sensor processor 181 uses the CFA to make a decision whether or not music is detected, for example, by comparing the value of CFA to a stored predetermined threshold to determine whether or not music is present. When a CFA meets or exceeds the threshold means that music is determined to be present in an audio sample. The larger the number of harmonics and the larger their power, the larger the value of CFA is, and the more certain the music determination. The PVC and the ordering of the harmonics is computationally intensive, and may therefore not be performed for every new window. The frequency of the PVC, $f_{PVC}$, may therefore be as low as possible, while still complying with the performance requirements of the music activity detector, such as e.g., latency, accuracy, or confidence. For example, the PVC may be performed every 50 frames, which with a frame rate of 8 ms would means every 400 ms.

In some embodiments, as described in 210 of flow diagram 200, audio is detected above a predetermined threshold as an entering condition to the remaining portions, 220-290 of flow diagram 200. This gatekeeping function of requiring audio detection above a threshold may be utilized because music activity detection is computationally intensive, consumes power and processing cycles, and may therefore be run selectively. For example, sensor processor 181 may operate initially as an Audio Activity Detector (AAD), which is not computationally intense, and only verifies if there is some audio activity above a certain threshold detected within an audio sample. Audio activity detection may be very simple and may only use a small buffer (which may be a circular buffer). The audio threshold may be passed due to speech, music, or even noise. Therefore, once the AAD detects audio above the threshold, the music activity detection (220-290 of flow diagram 200) is conducted to determine if music is present. The AAD threshold may be adaptive, and sensor processor 181 may adapt the threshold to the detected context or the user. The threshold may also be adapted to background noise, for example to correct for a constant background noise level to which music may be added.

The example described in conjunction with flow diagram 200 shows one example implementation of MAD 182, and many different variations and alternatives exist. Music activity detectors typically rely on the detection of frequencies related to music (e.g., associated with vocals (singing) and/or instrumentals).

General Description of Operation

Figure 3A:
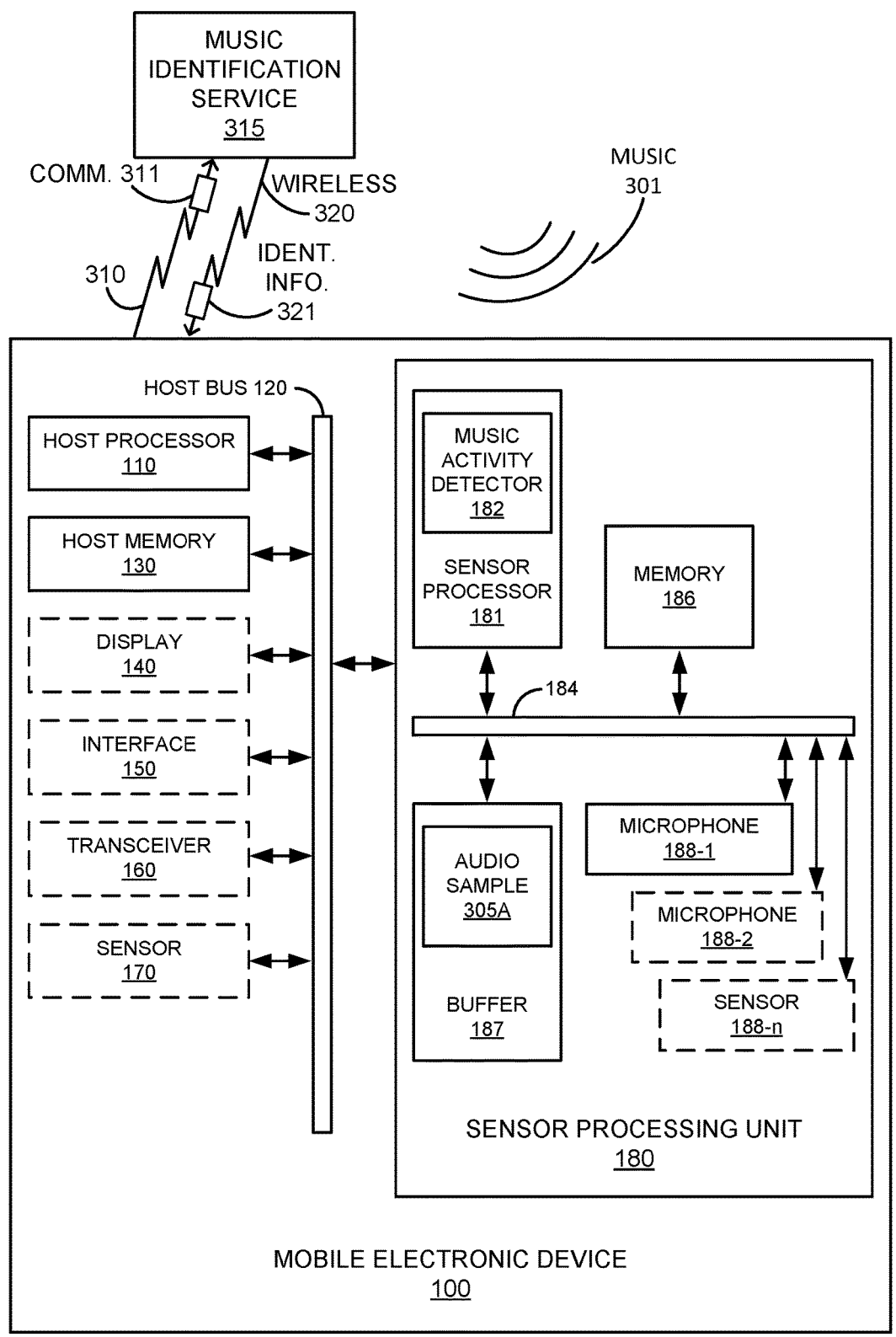
FIG. 3A is a block diagram of a mobile electronic device of FIG. 1 in an environment with audible music, and illustrates a communicative coupling between the mobile electronic device and music id service that is external to the mobile electronic device, in accordance with various embodiments.

FIG. 3A is a block diagram of a mobile electronic device of FIG. 1 in an environment with audible music, and illustrates a wireless communicative couplings 310/320 between the mobile electronic device and music identification service 315 that is external to the mobile electronic device 100, in accordance with various embodiments.

The wireless communicative couplings 310/320 may be in the form of cellular data communications, short range wireless communications (e.g., Bluetooth, Institute of Electrical and Electronics Engineers 802.15 specification communications, wireless personal area network, or the like), and/or Wi-Fi communications (e.g., wireless local area networking, Institute of Electrical and Electronics Engineers 802.11 specifications, or the like). In the embodiment depicted in FIG. 3A, sensor 188-1 is an acoustic sensor such as a microphone, and is configured to capture sound in its environment in the frequency range between approximately 20 Hz and 20 Khz. As such sensor 188-1 has been re-labeled as "microphone 188-1" in FIG. 3A as well as in FIG. 3B. While the 20 Hz to 20 kHz range is a common range for the limits of what humans can hear, in various embodiments operations herein may be carried out in a narrower range, such as a sub-range within the 20 Hz-20 kHz range that spans only 8 kHz or only 4 kHz.

Generally speaking, sensor processor 181 operates microphone 188-1 to capture an audio sample 305 and to detect for the presence of music activity in the audio sample 305. When music activity is detected, sensor processing unit 180 then sends a music detection signal 405 to host processor 110, and the audio sample 305 is then forwarded to or accessed by host processor 110. At some point after this, host processor 110 sends a communication 311 to music identification service 315 requesting identification of an item of music in the audio sample 305. In return, host processor 110 receives identification information 321, which includes at least the title (and perhaps more information) of the item of music that was identified as being in/associated with the audio sample 305. All or a portion of the identification information 321 may be stored, presented for access by a user, and/or utilized to send an identification signal 505 to sensor processing unit 180. In some embodiments, sensor processing unit 180 may be in direct communication with music identification service 315, which means that sensor processor 181 may perform some or all tasks otherwise performed by host processor 110.

More Comprehensive Description of Operation

With continued reference to FIG. 3A, in some embodiments, sensor processor 181 is communicatively coupled with and operates microphone 188-1 to receive an audio signal and capture an audio sample 305A therefrom of ambient music 301 from an environment in which microphone 188-1 is disposed. Sensor processor 181 performs music activity detection on the audio sample 305A to detect for the presence of music within the audio sample, but does not attempt to perform any identification of the music that is detected. In some embodiments, the detection of the music may be performed by a Music Activity Detector (MAD), such as MAD 182 or some other implementation of a MAD.

It should be appreciated that the detection of music activity and the capture of the audio sample may be contemporaneous or separated in time. In some embodiments, the detection of music activity may be performed on a captured and stored audio sample 305A. In some embodiments, after music activity is detected in audio signal from microphone 188-1, all or part of the audio signal can be contemporaneously saved as audio sample 305A. For example, if host processor 110 is unavailable or too busy, or the available (power) resources or settings prevent using the host processor, or (communication with) the music identification service 315 is not available, sensor processor 181 may write one or more audio samples to buffer 187, memory 186, memory 130, or any other available memory. The audio sample may be less than 10 seconds, and often will be in the range of 3-7 seconds, but may be less than one second in some embodiments. Responsive to detection of music within audio sample 305A, sensor processor 181 sends a music detection signal 405A to an external processor (e.g., host processor 110) located external to sensor processing unit 180. The music detection signal 405A indicates that music has been detected in the environment of sensor processing unit 180 and mobile electronic device 100. In one aspect, music detection signal 405A may also indicate to host processor 110 or another processor that an audio sample 305A is stored e.g., in buffer 187, and ready for retrieval by the processor. The music detection signal 405A may also serve as a wake-up signal to host processor 110.

Figure 4A:
FIGS. 4A-4C illustrates some examples of signals and/or information communicated from a sensor processing unit to a host processor located external to the sensor processing unit, in accordance with various embodiments.

FIG. 4A illustrates an example of sensor processing unit 180 sending a music detection signal 405A to host processor 110. For example, sensor processor 181 may send music detection signal 405A to host processor 110 or to some other application on or a portion of mobile electronic device 100 that is external to sensor processing unit 180. Responsive to receiving music detection signal 405A, host processor 110 may retrieve audio sample 305A from buffer 187. In an alternative embodiment, sensor processor 181 may communicate directly with an external processor, for example a processor belonging to music identification service 315, either using transceiver 160 or a transceiver (not shown) disposed in sensor processing unit 180 to forgo burdening and/or awakening host processor 110.

With reference again to FIG. 3A, audio sample 305A may be stored in buffer 187, either alone or with one or more other audio samples 305. In some embodiments, audio sample 305A may be forwarded automatically to host processor 110 or other portion of mobile electronic device that is external to sensor processing unit 180, either contemporaneously with (i.e., concatenated to/packaged with) or some predetermined time after music detection signal 405A. In other embodiments, audio sample 305A may be forwarded to host processor 110 or other portion of mobile electronic device that is external to sensor processing unit 180 in response to being requested/accessed by host processor 110 or in response to being requested/accessed by some portion of mobile electronic device 100 that is external to sensor processing unit 180.

Figure 4B:

FIG. 4B illustrates an example of sensor processing unit 180 sending audio sample 305A to host processor 110. For example, sensor processor 181 may send audio sample 305A to host processor 110 or to some other application on or a portion of mobile electronic device 100 that is external to sensor processing unit 180. Responsive to receiving music detection signal 405A, host processor 110 may retrieve audio sample 305A from buffer 187. In an alternative embodiment, sensor processor 181 may communicate directly with an external processor, for example a processor belonging to music identification service 315, either using transceiver 160 or a transceiver (not shown) disposed in sensor processing unit 180 to forgo burdening and/or awakening host processor 110.

In some embodiments, after an audio sample 305 is forwarded outside of sensor processing unit 180, a buffered version of it (if the audio sample 305 was not streamed outbound) is deleted or allowed to be overwritten. In some embodiments, when one or more audio samples are stored in buffer 187 they may fill buffer 187 to capacity or to a point where buffer 187 is considered to be full enough that it is in need of emptying. In such cases where a predetermined fullness is reached by storing one or more audio samples 305 in buffer 187, sensor processing unit 180 may send a "buffer full" signal 407 to host processor 110 or to some portion of or application on mobile electronic device 100 that is located external to sensor processing unit 180.

In some embodiments, sensor processing unit 180 may send music detection signal 405A to host processor 110 indicating that music has been detected. In response, host processor 110 may indicate to sensor processing unit 180 to start providing audio sample 305A. In some embodiments, the audio sample 305A that is sent out may not be the same audio sample upon which music activity detection was conducted, or else may include some portions that are different from the audio sample upon which music activity detection was conducted. Before sending the response, host processor 110 may verify that music identification service 315 is available and that means for communicating audio sample 305A are available. Sensor processing unit 180 may than start streaming audio sample 305A to host processor 110, and the audio sample 305A may include audio data buffered in sensor processing unit 180 (e.g., as used for analysis by the music activity detector). Audio sample 305A may first pass to host processor 110, or may be communicated directly to music identification service 315. Host processor 110 may also buffer all or part of audio sample 305 in host memory 130, or any other available memory. The buffering may be useful not to lose any audio data, for example in the case of a problem with the communication with music identification service 315. Sensor processing unit 180 may provide the audio data for a predetermined amount of time, e.g. 10 seconds, or may continue providing the audio data until host processor 110 or music identification service 315 instruct the sensor processing unit 180 to stop providing the data. For example, once the item of music has been correctly identified, music identification service 315 may send identification information 321 to host processor 110, and then the host processor 110 may instruct sensor processing unit 180 to stop providing the audio data. It should be appreciated that, in some embodiments, audio sample 305A may not be the audio sample sent from sensor processing unit 180 to host processor 110 or music identification service 315. Instead, a more current audio sample, captured after audio sample 305A, may be captured and provided; and it may include some or none of the content of audio sample 305A. The more current sample, may automatically be captured and provided or may be captured and provided in response to a request from host processor 110 or music identification service 315.

Figure 4C:
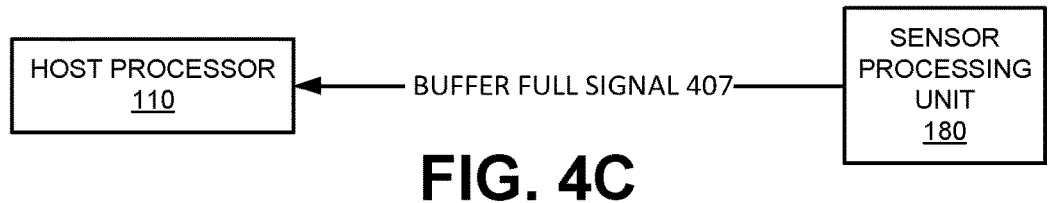

FIG. 4C illustrates an example of sensor processing unit 180 sending a buffer full signal 407 to host processor 110. For example, sensor processor 181 may send buffer full signal 407 to host processor 110 or to some other application on or a portion of mobile electronic device 100 that is external to sensor processing unit 180.

After the buffer full signal 407 is sent, host processor 110 (or other application on or a portion of mobile electronic device 100 that is external to sensor processing unit 180) may access or request the contents for buffer 187 so that they may be stored elsewhere, such as in host memory 130, or else may provide an instruction to delete/overwrite buffer 187. In response to a predetermined period of time expiring without host processor 110 (or other application on or a portion of mobile electronic device 100 that is external to sensor processing unit 180) accessing or retrieving the contents of buffer 187, sensor processing unit 180 allows buffer 187 to be overwritten with new information such as one or more subsequent (new) audio samples 305 that are captured.

Referring again, to FIG. 3A, after a music detection signal 405A has been received at host processor 110 and after the associated audio sample 305A has been received or accessed by host processor 110, a communication 311 may be sent to music identification service 315. The communication 311 over wireless communicative coupling 310 may be one or more of a request, command, or instruction, a transmission of data such as an audio sample 305A received from microphone 188-1, some other communication, or some combination of these and/or other communications, and may involve a request to identify an item of music in a sample audio from the environment of mobile electronic device 100. In some embodiments, as will be further described, wireless communication 311 may be sent from sensor processing unit 180, such as via transceiver 160. In some embodiments, when either a wireless fidelity ("Wi-Fi") connection to the Internet or a short range wireless communication connection the Internet is not available, host processor 110 or an application running thereon will: forgo use of an available cellular connection to the Internet; store an audio sample or samples in memory 130; and wait for a Wi-Fi or a short range wireless connection to the Internet before forwarding a communication 311 to music identification service 315. This preserves cellular data for in a data plan of mobile electronic device 100 for other uses. As such, depending on availability of wireless communication means, or communication preferences or settings of the user, communication with music identification service 315 is initiated as soon as an audio sample is available, or the audio sample is stored until communication is initiated at a later point in time.

Wireless communicative coupling 320 represents a communication from music identification services 315 that includes identification information 321. The identification information 321 is sent wirelessly in response receipt of communication 311 and further in response to identifying the music that was detected in the audio sample 305A that was captured in the environment of mobile electronic device 100. The identification information 321 includes the song title of the identified item of music (i.e., the song) that is associated with an audio sample captured by microphone 188-1, and may additionally include one or more of: a performer name of an artist/group associated with the identified item of music that is associated with an audio sample captured by microphone 188-1; an album title associated with the identified item of music that is associated with an audio sample captured by microphone 188-1; the total running time of the identified item of music that is associated with an audio sample captured by microphone 188-1; the remaining running time of the identified item of music that is associated with an audio sample captured by microphone 188-1; and purchase information, such as a link to a website or web service for acquiring the identified item of music (i.e., acquiring a song or album) that is associated with an audio sample captured by microphone 188-1 and/or for acquiring a concert ticket or other merchandise from the artist who performs the identified item of music.

Wireless communicative coupling 320 from music identification service 315 may also include a signal or response to indicate that the service was not able to identify the music in audio sample 305A. Furthermore, wireless communicative coupling 320 may contain instruction or suggestion on how to improve the selection of audio sample 305A in order to properly identify the music. For example, music identification service 315 may have determined multiple candidates corresponding to audio sample, and may suggest/request a second audio sample of a certain duration or specification/quality in order to positively identify the music.

In some embodiments, host processor 110 operates to display or otherwise make available all or some portion of identification information 321 for access by a user of mobile electronic device 100. For example, identification information 321 may be presented on a display such as display 140. The display of identification information 321 may be directed under the instruction of an application associated with the music identification services 315 that operates on host processor 110. All or a portion of the identification information 321 may be stored for future use or access by a user of mobile electronic device 100. For example, identification information 321 may be stored in host memory 130. This allows a user to review the identification information 321 at some later time, such as after completing a journey in an automobile. Part of making identification information 321 available for access by a user, may include presenting a user with an option to acquire a product associated with the audio sample from which an item of music was identified; such as an option to purchase a song, an album, a concert ticket, and/or performer memorabilia (e.g., a poster, a t-shirt, or the like).

A music identification service, such as music identification service 315, may be a privately owned and operated service, a subscription services, a publicly available service, or some combination thereof. Some music identification services may require a hosted portion, such as an application or "app," resident on mobile electronic device and run by host processor 110.

Some examples of music identification services include, without limitation: the open source Echoprint music identification service; the Midomi music identification service; the WatZatSong music identification service; the Shazam music identification service; Apple's Siri; Amazon's Alexa; and the like. The general principle of such music identification services is that an audio sample of music is provided to the music identification service as a request, and the music identification service identifies the song then provides the name of the song and other information (such as the artist, the running time, the remaining running time, purchase information, and the like) in response to the request. Depending on the requirements of the music identification service, the audio sample may experience some pre-processing, such as compression, truncation, fingerprinting, filtering, hashing, etc., such as by a resident application, before the resulting processed information about the audio sample is sent from the requester (i.e., mobile electronic device 100) to the music identification service 315.

With continuing reference to FIG. 3A, in some embodiments, after identification information 321 has been received at mobile electronic device 100 via wireless communicative coupling 320 from music identification service 315, host processor 110 sends an identification signal to sensor processing unit 180.

Figure 5:
FIG. 5 illustrates an example of signals and/or information communicated to a sensor processing unit from a host processor located external to the sensor processing unit, in accordance with various embodiments.

Attention is directed to FIG. 5 which illustrates an example of signals and/or information communicated to a sensor processing unit from a host processor located external to the sensor processing unit, in accordance with various embodiments. In particular, FIG. 5 illustrates an identification signal 505A being sent from host processor 110 to sensor processing unit 180. The identification signal 505A may be a simple signal sent to sensor processor 181 to indicate that a first item of music (i.e., a first song) associated with audio sample 305A has been identified. The identification signal 505A may also include additional information such as the total runtime or remaining runtime of the song that was identified in the audio sample 305A. As discussed above, in some embodiments, sensor processor 181 may communicate directly with music identification service 315, and thus an identification signal 505 may be sent directly from music identification service 315 to sensor processor 181.

Referring again to FIG. 3A, in some embodiments, sensor processor 181 adapts the music activity detection to the identified song in response to receiving the identification signal. The adaptation may comprise suspending operation one or more of audio sampling and the music activity detection for a period of time associated with the first song and provided by or in conjunction with the identification signal 505A. For example, when the remaining runtime of the song is provided in identification signal 505A, the adaptation may include suspending operation of one or more of audio sampling and the music activity detection for at least the remaining runtime of the song. In this manner, the next time MAD 182 is operated, a next item of music is playing, which avoids using resources for identifying the same item of music twice. Based on the returned identification signal, the end of the song may be predicted, and the next audio sampling and/or music activity detection may be started a predefined time (e.g. 30 seconds) after the end of the identified song. The additional delay insures that the MAD is not started right away at the beginning of the song, when not enough identifiable characteristics may be available, when a commercial may be playing, an announcer may be talking, etc. The AAD may also be used to detect a change from a first item of music to a second item of music, since this change is often associated with a drop in audio level. The AAD may be activated some time before the predicted end of the first item of music, and then used to define the start of the second item of music. MAD may then be performed again after the predefined time has passed with respect to the detected change. The identification signal may include an inaccuracy or range of the predicted remaining runtime, and the activation of the AAD may be adapted to the information. In another embodiment, where the total runtime of the song is provided by or in conjunction with identification signal 505A, the adaptation may comprise suspending operation of one or more of audio sampling and the music activity detection for either the entire runtime of the song or some fractional portion thereof such as ¾ of the runtime, ½ of the runtime, ¼ of the runtime, or the like. In some embodiments where no runtime or remaining runtime is provided by or in conjunction with identification signal 505A, sensor processor 181 may still direct an adaptation such as suspending operation one or more of audio sampling and the music activity detection for a predefined period of time such as 30 seconds, one minute, two minutes, or the like. In these and like embodiments, suspending operation of one or more of audio sampling and the music activity detection is a way to conserve power and processing cycles within sensor processing unit 180 during a time when it is likely that the identified item of music (song) may still be playing, or that the next item of music is playing, in the environment of mobile electronic device 100. Some examples of this adaptation are discussed further in conjunction with the microphone duty cycles illustrated in FIGS. 7A and 7B.

When an adaptation has suspended operation of audio sampling and the music activity detection for a period of time, sensor processor 181 resumes the audio sampling and the music activity detection after expiration of the period of time, and proceeds to detect for a change from the first song to a second song.

Even when there has been no adaptation to suspend operation of audio sampling and music detestation, upon receiving an identification signal that indicates a first song has been identified from audio sample 305A, sensor processor 181 operates to detect a change in a second audio sample 305B from the first song that was detected in the first audio sample 305A to a second song that is different from than first song. This change may be identified in a number of ways: such as identifying a diminished volume indicative of the first song ending and a second song beginning, and/or identifying a change in tempo and/or amplitude at a certain frequency such as a bass frequency. A change of song may also be detected by a change in the harmonic frequencies as discussed above. In some embodiments, after music activity is detected an audio signal from microphone 188-1 all or part of the audio signal can be contemporaneously saved as audio sample 305B. The audio sample may be less than 10 seconds, and often will be in the range of 3-7 seconds, but may also be less than one second. Responsive to detection of music within audio sample 305B, sensor processor 181 sends a music detection signal 405B to an external processor (e.g., host processor 110) located external to sensor processing unit 180. The music detection signal 405B indicates that music has been detected in the environment of sensor processing unit 180 and mobile electronic device 100.

A music activity detector, such as MAD 182, may have more than one mode of operation. In one aspect, a first mode may be used to detect an item of music for the first time, and a second mode may be used to detect a change of the item of music from a first item of music to a second item of music that is different from the first item of music. The second mode may be designed to require less power and computing resources than the first mode. For example, the music activity detector as explained in detail in relation to FIG. 2 may have different configurations and/or settings depending on the mode in which it is operating. Because the second mode is designed to required less resources than the first mode, those steps in the algorithm that require relatively a large amount of resources may be reduced or removed (to the extent possible). For example, the sampling rate of the microphone can be reduced, the window/frame rate can be reduced, and/or the number of frequency bins ($N_{bins}$) used in the frequency analysis can be reduced. Furthermore, as the ordering of the harmonics peaks also requires a lot of resources; since the main harmonics and their frequencies are known from the operation of music activity detector 182 in the first mode, in the second mode only the characteristics of these known harmonics may be determined and monitored (e.g., peak values of the known harmonics). When music activity detector 182, operating in the second mode, detects a change in characteristics of the currently sampled audio as compared to the first item of music, then music activity detector 182 may switch back to operation to the first mode of operation to detect for music in an audio sample. The first and/or second mode may also be adapted to the available computer and/or power resources, such as e.g., the battery level. Furthermore, the first and/or second mode may be adapted based on the expected power requirement of running the music detection in a continuous manner. For example, the music detection may be suspended if the power resources, or the required power resources over time, are below a predetermined threshold level.

Figure 6A:
FIGS. 6A and 6B illustrate some examples of signals and/or information communicated from a sensor processing unit to a host processor located external to the sensor processing unit, in accordance with various embodiments.
Figure 6B:

Attention is directed to FIGS. 6A-6B, which illustrate some examples of signals and/or information communicated from a sensor processing unit to a host processor located external to the sensor processing unit, in accordance with various embodiments. With reference to FIG. 6A, in one embodiment, after a predetermined period of time has passed since receipt of identification signal 505A, processing system continues to detect for music and when music is detected a second music detection signal is sent from sensor processing unit 180 to host processor 110 or to some other application on or a portion of mobile electronic device 100 that is external to sensor processing unit 180. The objective of an always-on embodiment of music activity detector 182 is to try to identify all the music audible in the environment of mobile electronic device 100, using a little as possible power and computing resources. As such, sensor processing unit 180 is optimized to try to activate a music activity detector only once for each item of music that is played, and to identify each item of music with a single communication with music identification service 315 (assuming a sequence of items of music is being played). Therefore, the predetermined period of time that passes after receipt of identification signal 505A, and the start of the music activity detector, to see if the first item of music that was identified was followed by a second item of music, is adapted. If sensor processor detects a change in the audio sample that indicates a change from the first detected song to a second and different song it sends music detection signal 405B to host processor 110 to indicate that a potential new item of music has been detected. In some embodiments, after a change from a first song to a second song is detected, sensor processor 181 waits a predetermined amount of time, such as 10 seconds or 30 seconds and then sends music detection signal 405B to host processor 110. This wait time further ensures that the second song is under way and not in a fade-out/fade-in period between songs.

Sensor processor 181 may detect a change in the audio sample 305B using different techniques, and the selected technique may depend on the available resources and the required accuracy. In one aspect, the sensor processor 181 may use an AAD to detect a potential change in an item of music, where basically only a change in sound level is used as an indication. This method requires few resources but is less reliable since changes or pauses within a song may lead to false positives. In another aspect, sensor processor 181 may be configured to detect for a change in music by detecting a change in harmonics, using all or part of the steps and method discussed in relation to FIG. 2. For example, after a first item of music has been identified, sensor processor 181 may detect for a change in harmonics by comparing all or a subset of the harmonic peaks corresponding to the first item of music with the newly detected harmonics. This comparison may be based, for example, on one or more of: the frequency of harmonics, the peak values of the harmonics, the distribution of the different harmonics, and/or their relative importance. If the results of this comparison show that the difference of the detected harmonics compared to the harmonics corresponding to the first item of music are larger than a threshold, sensor processor 181 may conclude that a new item of music is detected. At this point, sensor processor 181 may initiate identification of the second item of music through music identification service 315, either through host processor 110 or directly. The comparison of the current harmonics with the harmonics corresponding to the first item of music may be done at a predetermined time interval, defined so as to detect all changes in music at a minimum required resource level. The time interval may, for example, be as small as 10 seconds, 20 seconds, or 30 seconds, or may be as large as 1 minute, 2 minutes, or 3 minutes. A combination of the above techniques is also possible, where the AAD is used to trigger a harmonics comparison when a certain change in sound level is detected above a threshold. A minimum time interval between harmonics comparisons may be imposed.

FIG. 6B illustrates an example of sensor processing unit 180 sending second audio sample 305B to host processor 110. For example, sensor processor 181 may send second audio sample 305B to host processor 110 or to some other application on or a portion of mobile electronic device 100 that is external to sensor processing unit 180. Second audio sample 305B may be stored in buffer 187, either alone or with one or more other audio samples 305. In some embodiments, second audio sample 305B may be forwarded automatically to host processor 110 or other portion of mobile electronic device that is external to sensor processing unit 180, either contemporaneously with (i.e., concatenated to/packaged with) or some predetermined time after music detection signal 405B. In other embodiments, second audio sample 305B may be forwarded to host processor 110 or other portion of mobile electronic device that is external to sensor processing unit 180 in response to being requested/accessed by host processor 110 or in response to being requested/accessed by some portion of mobile electronic device 100 that is external to sensor processing unit 180.

It should be appreciated that a communication 311 about the second audio sample 305B may be similarly sent to music identification service 315 in the manner previously described. As previously described, mobile electronic device 100 may forgo sending a communication 311 over an available but non-preferred connection to the Internet in favor of storing the audio sample 305B and/or the communication 311 while waiting for a different but preferred connection to the Internet over which to send the communication 311. For example, mobile electronic device 100 may forgo sending a communication 311 over an available cellular data connection to the Internet in favor of storing the audio sample 305B and/or the communication 311 while waiting for a Wi-Fi or short range wireless connection to the Internet over which to send the communication 311. The waiting may be limited in time, such as by a watchdog timer that is set for 30 minutes, an hour, or some other time; and after expiration of this timer, an available but non-preferred connection to the Internet may be utilized for sending communication 311 to music identification service 315. The content of identification information 321 associated with a second audio sample 305B is of the same type as previously described. As previously described, responsive to the communication 311, identification information 321 regarding the second audio sample 305B may be received at mobile electronic device 100 in the manner previously described. As previously discussed content of the identification information 321 may be stored, presented for access by a user of mobile electronic device 100, used to provide an identification signal to sensor processing unit 180, and/or used to present a user of mobile electronic device 100 with an option to acquire a product associated with the second audio sample 305B.

Figure 3B:
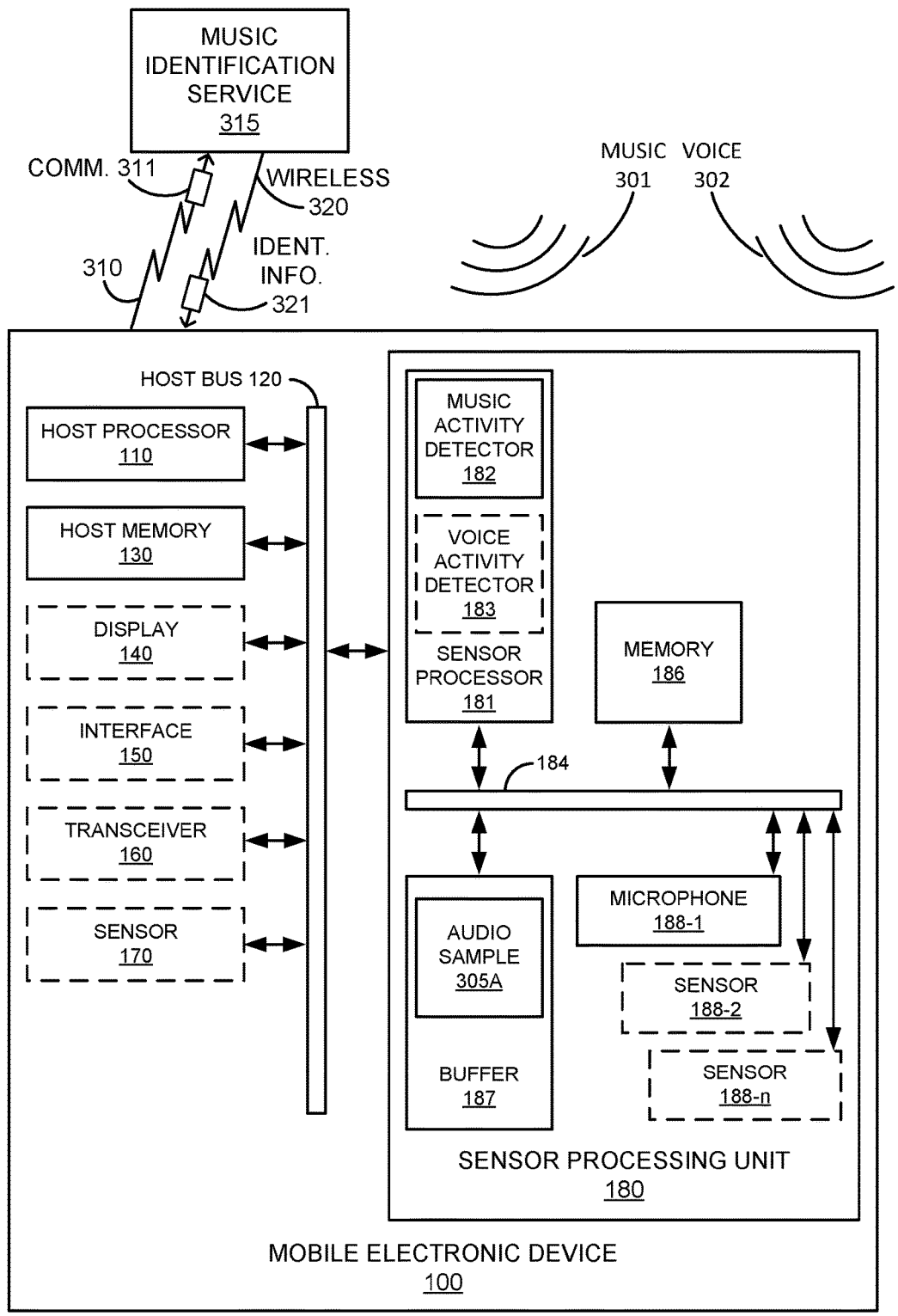
FIG. 3B is a block diagram of a mobile electronic device of FIG. 1 in an environment with audible music and audible voice, and illustrates a communicative coupling between the mobile electronic device and music identification service that is external to the mobile electronic device, in accordance with various embodiments.

FIG. 3B is a block diagram of a mobile electronic device of FIG. 1 in an environment with audible music and audible voice, and illustrates a wireless communicative coupling 310/320 between the mobile electronic device and music identification service 315 that is external to the mobile electronic device 100, in accordance with various embodiments. The embodiment illustrated in FIG. 3B operates in the same fashion as the previously described embodiment illustrated in FIG. 3A except for the added capability of sensor processing unit 180 detecting for audible voice 302 as well as audible music 301 and taking certain actions in response to detection of audible voice 302 in the operating environment. In the embodiment depicted in FIG. 3B, sensor 188-1 is an acoustic sensor such as a microphone, and is configured to capture sound in its environment in the frequency range between approximately 20 Hz and 20 kHz. As such sensor 188-1 has been re-labeled as "microphone 188-1" in FIG. 3B. Additionally, in some embodiments, sensor processing unit 180 employees a second microphone, and thus one or more of sensor 170 and sensor 188-2 is also a microphone with similar performance to microphone 188-1. Accordingly, sensor 188-2 has be re-labeled as "microphone 188-2" in FIG. 3B. While the 20 Hz to 20 kHz range is a common range for the limits of what humans can hear, in various embodiments operations herein may be carried out in a narrower range, such as a sub-range within the 20 Hz-20 kHz range that spans only 8 kHz or only 4 kHz.

In some embodiments associated with FIG. 3B, sensor processor 181 performs voice activity detection, such as through the use of Voice Activity Detector (VAD) 183, on the audio sample to detect for human speech within the audio sample in order to rule in or out the presence of voice activity (e.g., audible voice activity in the form of human speech). VAD 183 may be included in some embodiments of sensor processing unit 180. Detection of human speech may be performed in the time domain or in the frequency domain, and many possible methods are available in literature and may be known to the person skilled in the art. In one example embodiment, VAD 183 may use a frequency analysis and compare this to characteristics of noise and models of human speech. The VAD 183 and MAD 182 discussed above may share some of the processing and results in order to optimize use of resources. The objective of the voice activity detection is not to perform speech recognition but only to detect the presence of human speech. The capabilities to detect human speech may increase the accuracy of the system because human speech may interfere with the correct identification of the item of music. In some embodiments, responsive to detection of human speech (e.g., voice 302) within audio sample 305A or else detection of both human speech (e.g., voice 302) and music 301 within an audio sample 305, sensor processor 181 prevents a music detection signal 405 (e.g., 405A) from being sent to an external processor outside of sensor processing unit 180. Further, responsive to detection of both human speech (e.g., voice 302) and music 301 within audio sample 305, sensor processing unit 180 may delay sending a music detection signal 405 to an external processor (outside of sensor processing unit 180) for a predefined time such as 5 seconds or 30 seconds after it is detected that human speech (e.g., voice 302) has stopped but music 301 still detected. The delay may prevent the starting of the music activity detection during a short pause in the human speech, and the subsequent interference of the human speech with the music activity detection once restarted. This ensures that an audio sample 305 (e.g., 305A) that is associated with the sent music detection signal 405 (e.g., 405A) is free of human speech which might interfere with the identification of an item of music (i.e., a song) in the recorded signal from music 301 with audio sample 305A. In some situations, human speech may be present during the complete duration of the item of music, which would mean that no attempt may be made to identify the item of music. In order to prevent this, sensor processor may have a maximum allowed delay due to the presence of human speech, which means that after this delay has passed, an attempt to identify the item of music is made, irrespective of the presence of human speech or not. This delay may, for example, be 1 minute, 2 minutes or 3 minutes.

In some embodiments where both human speech (e.g., voice 302) and music 301 are both being detected simultaneously in an environment of sensor processing unit 180, sensor processor 181 may utilize at least two microphones (e.g., microphone 188-1 and 188-2 or microphone 188-1 and a microphone implemented as sensor 170) to apply a beam forming technique. For example, using microphone 188-1 and at least one additional microphone, sensor processor 181 can form a beam using well understood methods (such as adjusting the phase of signals from one or both of the microphones) to focus on the source of the music and to capture an audio signal in which music 301 has been isolated from human speech (e.g., voice 302) and then store an audio sample 305 of the isolated music. After this, a music detection signal 405 is sent to an external processor such as host processor 110 to indicate that music has been detected. The audio sample 305 with the isolated music can then be provided to the external processor in the manner previously discussed herein.

Figure 7A:
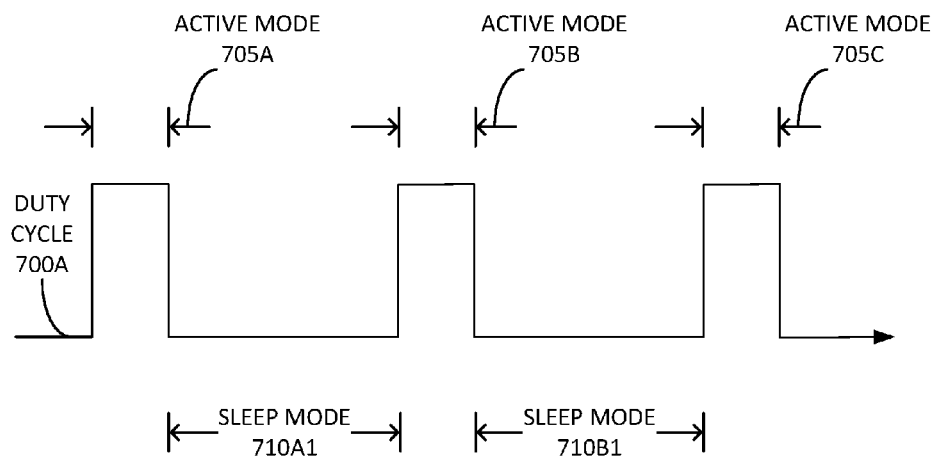
FIGS. 7A and 7B illustrate some examples of timing diagrams of operation of a microphone of a sensor processing unit for music activity detection, in accordance with various embodiments.
Figure 7B:
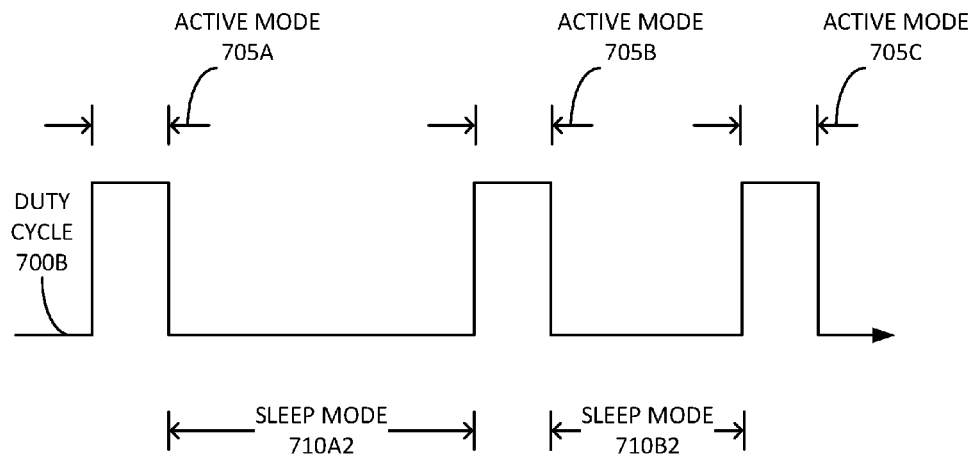

FIGS. 7A and 7B illustrate some examples of timing diagrams of operation of a microphone (e.g., 188-1) of a sensor processing unit 180 for music activity detection, in accordance with various embodiments. In some embodiments, sensor processor 181 operates a microphone (e.g., microphone 188-1 and or others) on a duty cycle 700 comprising an active mode portion 705 in which an audio sample 305 is captured with the microphone(s) and music activity detection is performed, followed by a sleep mode portion 710 in which no additional audio sample is captured by the microphone(s) for a predefined period of time. During the sleep mode, the microphone may be turned off or operated in a lower power mode that when it is used to capture an audio sample 305 during a first active mode portion 705.

With reference to FIG. 7A a duty cycle 700A for microphone 188-1 is illustrated. In FIG. 7A, music activity detection and audio sampling occur during active mode portions 705A, 705B, and 705C, which each last for a predetermined period of time, such as 5 seconds or 10 seconds, during duty cycle 700A. After an active mode portion of the duty cycle 700A, a fixed length sleep mode portion 710A1, 710B1, etc. of duty cycle 700A is entered. During a sleep mode portion, music activity detection is paused or adapted to a lower power setting, and in some embodiments microphone(s) may also be turned off or not used for collecting audio samples. For example, sleep mode portion 710A1 follows active mode portion 705A, and sleep mode portion 710B1 follows active mode portion 705B. The sleep mode portions 710A1 and 710B1 last for a predefined period of time. For example, a sleep mode portion may last 5 seconds, 10 seconds, 30 seconds, 2 minutes, 3 minutes, etc. In one embodiment, the predefined period of time for a sleep mode portion is between 30 seconds and 2 minutes in length. Although the active mode portions 705A, 705B, and 705C have been described as being fixed in length, they may be variable in some embodiments. For example, they may last until a music detection signal 405 is sent out from sensor processing unit 180 or until a music detection signal 405 is sent out from sensor processing unit 180 and an identification signal 505 is received in response thereto. In some embodiments, the duty cycling of the active mode and the sleep mode may refer to the activation of the music activity detection. In this case, microphone 188-1 is operated continuously, and the music activity detection is activated and de-activated periodically.

With reference to FIG. 7B a duty cycle 700B for microphone 188-1 is illustrated. In FIG. 7B, active mode portions 705A, 705B, and 705C, occurs during duty cycle 700B. Active mode portions of time for music activity detection and sampling last until a music detection signal 405 is sent to host processor 110 or until an identification signal 505 is received at sensor processing unit 180 and thus maybe somewhat fixed (as illustrated) or may vary as previously described. After an active mode portion of duty cycle 700B, a variable length sleep mode portion 710A2, 710B2, etc. of duty cycle 700B is entered. During a sleep mode portion, music activity detection is paused or adapted to a lower power setting, and in some embodiments microphone(s) may also be turned off or not used for collecting audio samples. For example, sleep mode portion 710A1 follows active mode portion 705A, and sleep mode portion 710B1 follows active mode portion 705B. The sleep mode portions 710A1 and 710B1 last for a period of time that is associated with information provided as part of the music detection signal. For example, the sleep mode portions may vary in association with the total runtime or the remaining runtime of an item of identified music. In some embodiments, the length of sleep mode portion(s) may comprise suspending the music activity detection for either the entire runtime of the song or some fractional portion thereof such as ¾ of the runtime, ½ of the runtime, ¼ of the runtime, or the like. Thus, each sleep mode portion 710A2, sleep mode portion 710B2, etc. will be for an independently determined length of time and may vary compared to the length of other sleep mode portions in duty cycle 700B. In some embodiments, the length of sleep mode portion(s) may comprise suspending the music activity detection for either at least the remaining runtime of the song or the remaining runtime plus a predetermined time such as 5 seconds or 10 seconds. In such an embodiment, each sleep mode portion 710A2, 710B2, etc. will be for an independently determined length of time and may vary compared to the length of other sleep mode portions in duty cycle 700B. In some embodiments operation of the microphone(s) for audio sampling may also occur during a sleep mode portion while music activity detection is suspended.

Example Method(s) of Operation

FIGS. 8A-8F illustrate a flow diagram 800 of an example method of identifying music, according to various embodiments. Procedures of this method will be described with reference to elements and/or components of one or more of FIGS. 1-7B. It is appreciated that in some embodiments, the procedures may be performed in a different order than described, that some of the described procedures may not be performed, and/or that one or more additional procedures to those described may be performed. Flow diagram 800 includes some procedures that, in various embodiments, are carried out by one or more processors under the control of computer-readable and computer-executable instructions that are stored on non-transitory computer-readable storage media (e.g., memory 186). It is further appreciated that one or more procedures described in flow diagram 800 may be implemented in hardware, or a combination of hardware with firmware and/or software.

With reference to FIG. 8A, at procedure 801 of flow diagram 800, in various embodiments, a first processor operates a microphone to capture an audio sample from an environment in which the microphone is disposed. With reference to FIGS. 3A and 3B, this can comprise sensor processor 181 operating microphone 188-1 to capture audio sample 305A.

With continued reference to FIG. 8A, at procedure 803 of flow diagram 800, in various embodiments, the first processor performs music activity detection on the audio sample to detect for music within the audio sample. With reference to FIGS. 3A and 3B, this can comprise sensor processor 181 performing music activity detection on audio sample 305A.

With continued reference to FIG. 8A, at procedure 805 of flow diagram 800, in various embodiments, responsive to detection of music within the audio sample, the first processor sends a music detection signal to a second processor. The first processor and the second processor may both disposed within a mobile electronic device. With reference to FIGS. 3A, 3B, and 4A this can comprise sensor processor 181 sending music detection signal 405A to host processor 110.

With continued reference to FIG. 8A, at procedure 807 of flow diagram 800, in various embodiments, the second processor wirelessly sends information about the audio sample to a music identification service. With reference to FIGS. 3A and 3B, this can comprise host processor 110 or an application resident thereon sending communication 311 to music identification service 315 via wireless communication coupling 310. The communication 311 may be routed from host processor through transceiver 160 which then sends it via wireless communicative coupling 310 to music identification service 315.

With continued reference to FIG. 8A, at procedure 809 of flow diagram 800, in various embodiments, identification information associated with the audio sample from the music identification service is wirelessly received at the second processor. With reference to FIGS. 3A and 3B, this can comprise mobile electronic device receiving identification information 321 via wireless communicative coupling 320 from music identification service 315. The wireless transmission of identification information 321 may, in some embodiments be, received by transceiver 160 and routed to host processor 110.

With reference to FIG. 8B, at procedure 820 of flow diagram 800, in various embodiments, the method as described in 801-809 further comprises storing, by the second processor, the identification information for future access by a user of the mobile electronic device. With reference to FIGS. 3A and 3B, this may comprise host processor 110 storing all or a portion of identification information 321 within memory 130 for future access by a user of mobile electronic device 100.

With reference to FIG. 8C, at procedure 830 of flow diagram 800, in various embodiments, the method as described in 801-809 further comprises providing, by the second processor, the identification information for access by a user of the mobile electronic device. With reference to FIGS. 3A and 3B, this may comprise host processor 110, or an application executed thereon, presenting all or a portion of identification information 321 upon a display such as display 140.

With reference to FIG. 8D, at procedure 840 of flow diagram 800, in various embodiments, the method as described in 801-809 further comprises foregoing, by the second processor, use of an available but non-preferred connection to the Internet to wait for availability of a preferred connection to the Internet to wirelessly provide information about the audio sample to the music identification service. While waiting, the audio sample and any other audio samples obtained during the wait are stored for later transmission with the preferred connection to the Internet becomes available. In general, when there is technique of communication (e.g., Wi-Fi) with music identification service 315 that is preset as being preferred over other techniques, and when this preset technique of communication is not available (even when other techniques of communication via the Internet, such as cellular data, are available), the host processor 110 may wait and buffer audio samples and/or communications 311 until the preferred technique of communication becomes available for communicating with music identification service 315. With reference to FIGS. 3A and 3B, this can comprise host processor 110, or an application executing thereon, forgoing the use of an available cellular data connection to the Internet and then onward to music identification service 315 in favor of waiting for an available Wi-Fi data connection to the Internet and then onward to music identification service 315. Once the Wi-Fi data connection is available, the communication 311 and other communications 311 that have been saved (and any information associated therewith) is then forwarded over the Wi-Fi connection to the music identification service 315 for identification. This waiting can assist with conserving the use of cellular data which may be limited in amount or more expensive in cost to a user of mobile electronic device 100 versus similar communication carried out via a Wi-Fi data connection.

With reference to FIG. 8E, at procedure 850 of flow diagram 800, in various embodiments, the method as described in 801-809 further comprises, the mobile electronic device presenting a user of the mobile electronic device with an option to acquire a product associated with the audio sample wherein the product is selected from the group consisting of: a song; an album; and a concert ticket. The presentation is based on the identification information. With reference to FIGS. 3A and 3B, this can comprise host processor 110, or an application executing thereon, providing a user selectable link, such as a hyperlink, on display 140. In response to a user selecting the link, a product purchase may be facilitated or a web page may be opened which allows a product to be presented for purchase and its purchase facilitated.

With reference to FIG. 8F, at procedure 860 of flow diagram 800, in various embodiments, the method as described in 801-809 further comprises suspending music activity detection on a second audio sample, after the audio sample, for a period of time, wherein the period of time is based on the identification information. With reference to FIG. 7B, in some embodiments, a portion of identification information 321, such as a total runtime or remaining runtime in identified music item (i.e., a song) can be supplied by host processor 110 in the form of an identification signal 505 to sensor processing unit 180. Sensor processor 181 may utilize the total runtime or remaining runtime of an identified song to determine an amount of time to place music activity detector 182 in a sleep mode during which music activity detection (and in some embodiments, audio sampling and/or microphone operation) is paused. As discussed herein a sleep mode portion 710A2 between a first active mode portion 705A (based on a first audio sample and first music activity detection) and a second active mode portion 705B (based second audio sample and second music activity detection) may vary in association with the total runtime or the remaining runtime of an item of identified music. In some embodiments, the length of sleep mode portion 710A2 may comprise suspending operation suspending the music activity detection for either the entire runtime of the song or some fractional portion thereof such as ¾ of the runtime, ½ of the runtime, ¼ of the runtime, or the like. In some embodiments, the length of sleep mode portion 710A2 may comprise suspending the music activity detection for either at least the remaining runtime of the song or the remaining runtime plus a predetermined time, such as 1 second extra, 5 seconds extra, or 10 seconds extra, etc. beyond the remaining runtime.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A sensor processing unit comprising:
   a microphone; and
   a sensor processor coupled with said microphone, said sensor processor configured to:
      operate said microphone to capture an audio sample from an environment in which said microphone is disposed;
      perform music activity detection on said audio sample to detect for music within said audio sample; and
      responsive to detection of music within said audio sample, send a music detection signal to an external processor located external to said sensor processing unit, said music detection signal indicating that music has been detected in said environment.

2. The sensor processing unit of claim 1, wherein said sensor processing unit further comprises:
   a buffer coupled with said sensor processor; and
   wherein said sensor processor is further configured to:
      store said audio sample in said buffer;
      send a buffer full indication to said external processor; and
      responsive to said external processor failing to access contents of said buffer after expiration of a predetermined period of time following said buffer full indicator being sent, overwrite said buffer with new information.

3. The sensor processing unit of claim 1, wherein said sensor processor is further configured to:
   provide one of said audio sample and a second audio sample to said external processor after detection of music in said audio sample, wherein said second audio sample is captured after said audio sample.

4. The sensor processing unit of claim 3, wherein said one of said audio sample and said second audio sample is provided to said external processor in response to a request from said external processor.

5. The sensor processing unit of claim 3, wherein said one of said audio sample and said second audio sample is provided as a stream to said external processor until said external processor provides an instruction to cease said stream.

6. The sensor processing unit of claim 1, wherein said sensor processing unit is configured to receive an identification signal from said external processor, wherein said identification signal indicates a first song corresponding to said audio sample has been identified.

7. The sensor processing unit of claim 6, wherein said sensor processor is further configured to:
   adapt said music activity detection to said first song in response to receiving said identification signal, wherein said adaptation comprises suspending said music activity detection for a period of time associated with said first song and provided by said identification signal.

8. The sensor processing unit of claim 1, wherein said sensor processor is operated in a first mode to detect for a first song, and said sensor processor is operated in a second mode to detect for a change from said first song to a second song, and switching from said first mode to said second mode is performed after receiving an identification signal from said external processor, wherein said identification signal indicates a first song has been identified.

9. The sensor processing unit of claim 1, wherein said music comprises a first song and wherein sensor processor is further configured to:
   detect a change in a second audio sample from said first song to a second song that is different from said first song.

10. The sensor processing unit of claim 9, wherein said sensor processor is further configured to:
    send a second music detection signal to said external processor following a predefined delay in response to said detection of said change from said first song to said second song, wherein said second music detection signal is sent a predetermined period of time after said detection of said change.

11. The sensor processing unit of claim 1, wherein said sensor processor is further configured to:
    perform voice activity detection on said audio sample to detect for human speech within said audio sample.

12. The sensor processing unit of claim 11, wherein, responsive to both human speech and music being detected within said audio sample, said sensor processor is further configured to:
    prevent said music detection signal from being sent to said external processor.

13. The sensor processing unit of claim 11, wherein responsive to both human speech and music being detected within said audio sample, said sensor processor is further configured to:
    send said music detection signal to said external processor a predefined time after it is detected that human speech has stopped but music is still detected.

14. The sensor processing unit of claim 11, wherein responsive to both human speech and music being detected, said sensor processor is further configured to:
    apply a beam forming technique using said microphone and at least one additional microphone to capture a second audio signal in which said music has been isolated from human speech: and
    send music detection signal to said external processor in response to capturing said second audio signal.

15. The sensor processing unit of claim 1, wherein said sensor processor is configured to operate said microphone on a duty cycle comprising an active mode in which music activity detection is performed on said audio sample, followed by a sleep mode in which said music activity detection is suspended for a predefined period of time, wherein said predefined period of time is between 30 seconds and 2 minutes in length.

16. The sensor processing unit of claim 1, wherein the performing the music activity detection is adapted to at least one of available power resources and available computing resources.

17. A mobile electronic device comprising:
    a host processor;
    a microphone; and
    a sensor processing unit coupled with said host processor and said microphone, said sensor processing unit configured to:
       operate said microphone to capture an audio sample from an environment in which said microphone is disposed;
       perform music activity detection on said audio sample to detect for music within said audio sample; and
       responsive to detection of music within said audio sample, send a music detection signal to said host processor, wherein said host processor is located external to said sensor processing unit, said music detection signal indicating that music has been detected in said environment.

18. The mobile electronic device of claim 17, wherein sensor processor is further configured to:
provide one of said audio sample and a second audio sample to said external processor after detection of music in said audio sample, wherein said second audio sample is captured after said audio sample.

19. The mobile electronic device of claim 18, wherein said one of said audio sample and said second audio sample is provided to said host processor in response to a request from host processor.

20. The mobile electronic device of claim 18, wherein said one of said audio sample and said second audio sample is provided to said host processor along with said music detection signal.

21. The mobile electronic device of claim 17, wherein responsive to receipt of said music detection signal, said host processor is configured to:
wirelessly provide information about said audio sample to a music identification service; and
wirelessly receive identification information associated with said audio sample from said music identification service, said identification information comprising at least one of: a song title associated with said music detected in said audio sample; a performer name associated with said music detected in said audio sample; an album title associated with said music detected in said audio sample; a total duration time of a song associated with said music detected in said audio sample; and a remaining duration time from the time corresponding to the audio sample associated with said music detected in said audio sample.

22. The mobile electronic device of claim 21, wherein, responsive to identification of a song in said audio sample, said host processor is further configured to:
send an identification signal back to said sensor processing unit.

23. The mobile electronic device of claim 21, wherein said identification information comprises information related to runtime remaining in said song, and wherein said sensor processing unit is further configured to:
operate in a lower power mode for a period of time based on said runtime remaining time in said song.

24. The mobile electronic device of claim 21, wherein said host processor is further configured to:
forego, by the host processor, use of an available but non-preferred connection to the Internet;
store said audio sample; and
wait for availability of a preferred connection to the Internet to wirelessly provide information about the stored audio sample to the music identification service.

25. The mobile electronic device of claim 17, wherein responsive to receipt of said music detection signal, said host processor is configured to:
perform a second music activity detection on said audio sample to detect for said music within said audio sample;
responsive to detection of said music within said audio sample by said second music activity detection, wirelessly provide information about said audio sample to a music identification service; and
wirelessly receive identification information associated with said audio sample from said music identification service, said identification information comprising at least one of: a song title associated with said music detected in said audio sample; a performer name associated with said music detected in said audio sample; and an album title associated with said music detected in said audio sample.

26. A method of identifying music, said method comprising:
operating, by a sensor processor, a microphone to capture an audio sample from an environment in which said microphone is disposed;
performing, by said sensor processor, music activity detection on said audio sample to detect for music within said audio sample;
responsive to detection of music within said audio sample, sending, by said sensor processor, a music detection signal to a host processor in order to wake said host processor from a low-power mode that uses less power than a full-power mode of said host processor, wherein said sensor processor and said host processor are both disposed within a mobile electronic device, wherein said sensor processor uses less power than said host processor, and wherein said sensor processor conserves power of said mobile electronic device by accomplishing said music activity detection on said audio sample while said host processor is in said low-power mode;
wirelessly providing, by said host processor, information about said audio sample to a music identification service located external to said mobile electronic device; and
wirelessly receiving, at said host processor, identification information associated with said audio sample from said music identification service.

27. The method as recited in claim 26, further comprising:
storing, by said host processor, said identification information for future access by a user of said mobile electronic device.

28. The method as recited in claim 26, further comprising:
suspending said music activity detection performed by said sensor processor on a second audio sample, captured by said sensor processor after said audio sample, for a period of time, wherein said period of time is based on said identification information.

* * * * *